United States Patent
Keal et al.

(10) Patent No.: US 10,458,812 B2
(45) Date of Patent: Oct. 29, 2019

(54) SENSOR OUTPUT CONFIGURATION

(71) Applicant: InvenSense, Inc., San Jose, CA (US)

(72) Inventors: William Kerry Keal, Santa Clara, CA (US); Timothy Lynn Kelliher, San Leandro, CA (US)

(73) Assignee: InvenSense, Inc., San Jose, CA (US)

( * ) Notice: Subject to any disclaimer, the term of this patent is extended or adjusted under 35 U.S.C. 154(b) by 756 days.

(21) Appl. No.: 14/929,013

(22) Filed: Oct. 30, 2015

(65) Prior Publication Data

US 2017/0122771 A1    May 4, 2017

(51) Int. Cl.
*G01C 25/00* (2006.01)
*H04W 99/00* (2009.01)
*H04W 88/00* (2009.01)

(52) U.S. Cl.
CPC .......... *G01C 25/005* (2013.01); *H04W 88/00* (2013.01); *H04W 99/00* (2013.01)

(58) Field of Classification Search
CPC ........ G01C 25/005; G01C 25/00; H04Q 1/00; H04W 88/00; H04W 99/00
See application file for complete search history.

(56) References Cited

U.S. PATENT DOCUMENTS

| | | | |
|---|---|---|---|
| 2008/0231464 A1* | 9/2008 | Lewis | H05B 37/0272 340/5.74 |
| 2013/0055001 A1* | 2/2013 | Jeong | G06F 1/3228 713/323 |
| 2014/0023087 A1* | 1/2014 | Czompo | H04W 4/02 370/465 |
| 2016/0212392 A1* | 7/2016 | Zhang | H04N 9/31 |

* cited by examiner

*Primary Examiner* — Mohamed Charioui
*Assistant Examiner* — Catherine T. Rastovski

(57) ABSTRACT

In a method of sensor output configuration, sensor output specifications for a plurality of sensor clients of a sensor are acquired. A first sensor output specification for a first of the sensor clients defines a first value for a sensor parameter. A second sensor output specification for a second of the sensor clients defines a second value for the sensor parameter. The first value and the second value are different. A sensor processing unit, which includes the sensor, is configured based on the sensor output specifications to: simultaneously provide an output of the sensor to the sensor clients according to the first value while a first operational condition is met; and simultaneously provide the output of the sensor to the sensor clients according to the second value while a second operational condition is met, wherein the first operational condition and the second operational condition are different.

22 Claims, 4 Drawing Sheets

300

ACQUIRING, FOR A SENSOR, SENSOR OUTPUT SPECIFICATIONS FOR A PLURALITY OF SENSOR CLIENTS, WHEREIN A FIRST SENSOR OUTPUT SPECIFICATION FOR A FIRST OF THE PLURALITY OF SENSOR CLIENTS DEFINES A FIRST VALUE FOR A SENSOR PARAMETER, WHEREIN A SECOND SENSOR OUTPUT SPECIFICATION FOR A SECOND OF THE PLURALITY OF SENSOR CLIENTS DEFINES A SECOND VALUE FOR THE SENSOR PARAMETER, AND WHEREIN THE FIRST VALUE AND THE SECOND VALUE ARE DIFFERENT
310

BASED ON THE SENSOR OUTPUT SPECIFICATIONS FOR THE PLURALITY OF SENSOR CLIENTS, CONFIGURING A SENSOR PROCESSING UNIT WHICH INCLUDES THE SENSOR TO:
320

SIMULTANEOUSLY PROVIDE AN OUTPUT OF THE SENSOR TO THE PLURALITY OF SENSOR CLIENTS ACCORDING TO THE FIRST VALUE WHILE A FIRST OPERATIONAL CONDITION IS MET
322

SIMULTANEOUSLY PROVIDE THE OUTPUT OF THE SENSOR TO THE PLURALITY OF SENSOR CLIENTS ACCORDING TO THE SECOND VALUE WHILE A SECOND OPERATIONAL CONDITION IS MET, WHEREIN THE FIRST OPERATIONAL CONDITION AND THE SECOND OPERATIONAL CONDITION ARE DIFFERENT
324

SENSOR OUTPUT CONFIGURATION

BACKGROUND

Advances in technology have enabled the introduction of mobile electronic devices that feature an ever increasing set of capabilities. Smartphones, for example, now offer sophisticated computing and sensing resources together with expanded communication capability, digital imaging capability, and user experience capability. Likewise, tablets, wearables, media players, and other similar electronic devices have shared in this progress and often offer some or all of these capabilities. Many of the capabilities of mobile electronic devices are enabled by sensors (e.g., accelerometers, gyroscopes, pressure sensors, thermometers, etc.) that are included in the mobile electronic device. That is, one or more aspects of the capabilities offered by mobile electronic devices will rely upon information provided by one or more of the sensors of the mobile electronic device in order to provide or enhance the capability. In general, sensors detect or measure physical or environmental properties of the device or its surroundings, such as the orientation, velocity, or acceleration of the device, or the temperature of the device and/or its surroundings, among others. Output data from a particular sensor may be utilized to support one or more capabilities of a mobile electronic device.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
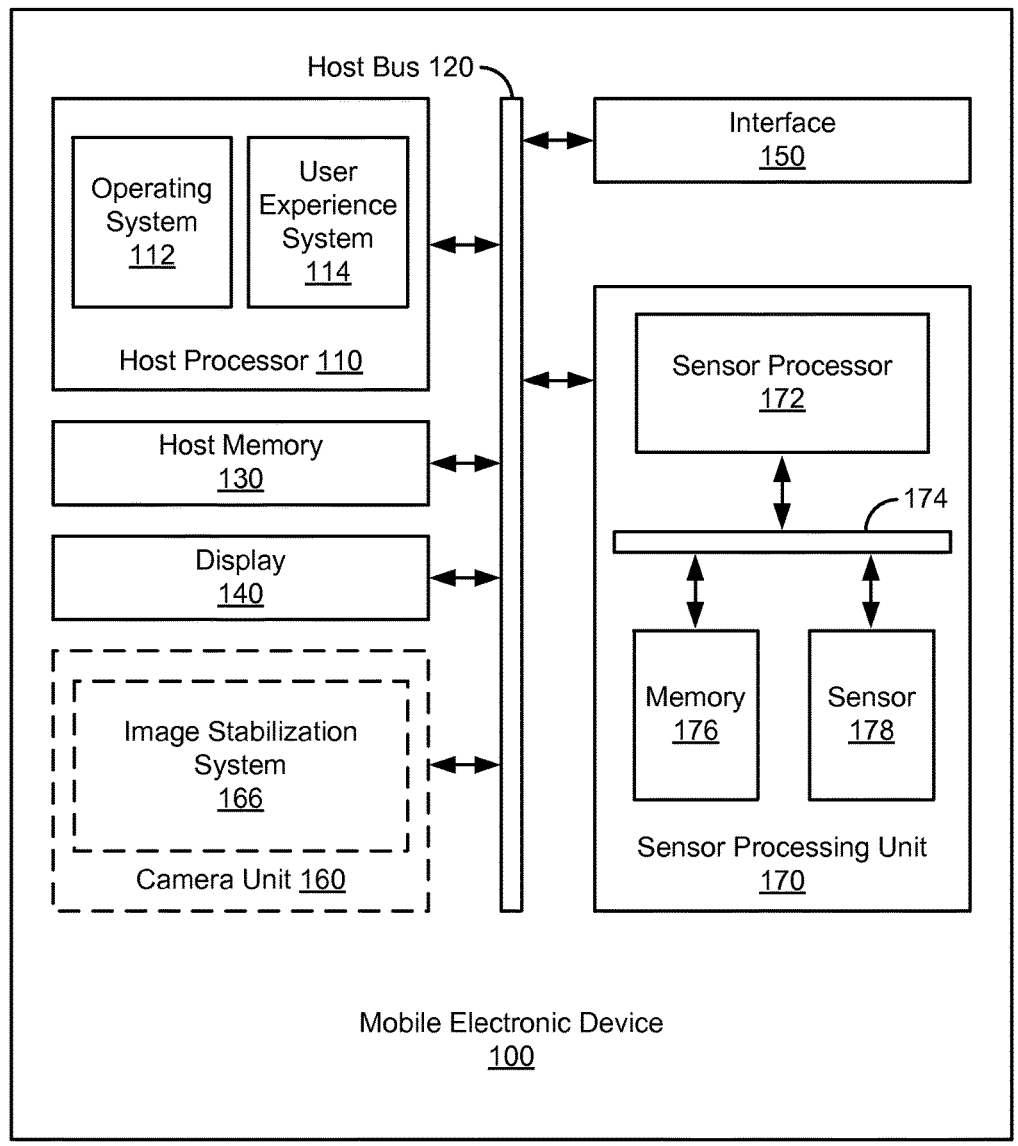
FIG. 1 is a block diagram of a mobile electronic device which includes a sensor processing unit, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "acquiring," "configuring," "providing," "utilizing," "delaying," "filtering," and "outputting," or the like, refer to the actions and processes of an electronic device such as: a sensor processing unit, a sensor processor, a host processor, a processor, a sensor, a memory, a mobile electronic device, or the like or combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

In some instances of operation of a mobile electronic device, output data from a sensor of the mobile electronic device may be required in support of more than one capability of the mobile electronic device. Further, in such instances, each of the plurality of capabilities supported by a sensor may have a different (and possibly conflicting) set of requirements for the format of the output data from the sensor. Conventionally, multiple sensors of the same type may have been employed to service multiple sensor clients that have different output specifications, or else a single sensor may have been set in a fashion that compromised the output specifications of one of the multiple sensor clients. Capabilities of a mobile electronic device include various applications and functions performed by, or running on, the mobile electronic device, many of which require input from a sensor. By way of example and not of limitation, a mobile electronic device may have the capability of counting and displaying a total number of counted steps the user of the device takes. In this counted step example, the program, device, or application on the mobile electronic device which actually counts the steps receives input from one or more motion sensors, such as accelerometers, and is thus a sensor client of one or more motion sensor(s). The same accelerometer(s) may report information to one or more additional clients. Herein, various techniques are described for sensor output configuration. More specifically, techniques, components, methods, and procedures described herein facilitate selectively controlling the output data configuration of a single sensor and the provision of the output data to a plurality of different sensor clients thereof based on the different sensor output specification requirements of the plurality of different sensor clients that receive and utilize data output from the sensor. As will be described, in some of these embodiments, sensor output data may be filtered or otherwise conditioned prior to being provided to a sensor client such that the output data meets the output data specifications of the particular sensor client.

Discussion begins with a description of a mobile electronic device with a sensor processing unit that includes at least one sensor. This is followed by some examples of operational descriptions of the sensor processing unit and sensor. Operation of the mobile electronic device, the sensor processing unit, and various components of the sensor processing unit is then further described in conjunction with description of an example method of sensor output configuration.

Example Mobile Electronic Device

Turning now to the figures, FIG. 1 is a block diagram of an example mobile electronic device 100. As will be appreciated, mobile electronic device 100 may be implemented as a device or apparatus, such as a handheld device that can be moved in space by a user and its motion and/or orientation in space therefore sensed. For example, such a handheld mobile electronic device may be, without limitation, a mobile phone (e.g., smartphone, cellular phone, a phone running on a local network, or any other telephone handset), wired telephone (e.g., a phone attached by a wire), personal digital assistant (PDA), video game player, video game controller, navigation device, activity or fitness tracker device (e.g., bracelet or clip), smart watch, other wearable device, mobile internet device (MID), personal navigation device (PND), digital still camera, digital video camera, binoculars, telephoto lens, portable music, video, or media player, remote control, or other handheld device, or a combination of one or more of these devices.

As depicted, mobile electronic device 100 may include a host processor 110, host bus 120, host memory 130, display 140, interface 150, and sensor processing unit 170. Some embodiments of mobile electronic device 100 may further include a camera unit 160 (depicted in dashed lines) and/or other components.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of mobile electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, camera unit 160, sensor processing unit 170, and other components of mobile electronic device 100 may be coupled communicatively through host bus 120 in order to exchange commands and data. Depending on the architecture, different bus configurations may be employed as desired. For example, additional buses may be used to couple the various components of mobile electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system 112 layer can be provided for mobile electronic device 100 to control and manage system resources in real time, enable functions of application software and other layers, and interface application programs with other software and functions of mobile electronic device 100. Similarly, a user experience system 114 may operate upon or be facilitated by operating system 112. User experience system 114 may comprise one or more software application programs such as menu navigation software, games, camera function control, gesture recognition, image processing or adjusting, navigation software, communications software, such as telephony or wireless local area network (WLAN) software, or any of a wide variety of other software and functional interfaces for interaction with the user can be provided. In some embodiments, multiple different applications can be provided on a single mobile electronic device 100, and in some of those embodiments, multiple applications can run simultaneously as part of user experience system 114. In some embodiments, user experience system 114, operating system 112, or both may rely upon output data from a sensor, such as sensor 178, in order to provide user functionality. For example, output data from an accelerometer sensor may be utilized by operating system 112 to orient content on display 140. An application of user experience system 114 may also simultaneously utilize output data from the same accelerometer sensor to count walking steps taken by a human user of mobile electronic device 100.

Display 140 may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera unit 160.

Interface 150 can be any of a variety of different devices providing input and/or output to a user, such as audio speakers, touch screen, real or virtual buttons, joystick, slider, knob, printer, scanner, computer network I/O device, other connected peripherals and the like.

Camera unit 160, when included, typically includes an optical element, such as a lens which projects an image onto an image sensor of camera unit 160. Camera unit 160 may include an image stabilization system 166, which compensates for any motion of the mobile electronic device 100 in order to obtain stabilized video or improve the quality of still images. In one example embodiment, image stabilization system 166 may be an Optical Image Stabilization (OIS) system. In optical image stabilization, the optical element may be moved with respect to the image sensor in order to compensate for motion of the mobile electronic device. OIS systems typically include/utilize processing to determine compensatory motion of the optical element of camera unit 160 in response to sensed motion of the mobile electronic device 100 or portion thereof, such as the camera unit 160 itself. Actuators within camera unit 160 operate to provide the compensatory motion in the image sensor or lens, and position sensors may be used to determine whether the actuators have produced the desired movement. In one aspect, an actuator may be implemented using voice coil motors (VCM) and a position sensor may be implemented with Hall sensors, although other suitable alternatives may be employed. Camera unit 160 may have its own dedicated motion sensors to determine the motion, may receive motion data from a motion sensor external to camera unit 160 (e.g., in sensor processing unit 170), or both. The OIS controller may be incorporated in camera unit 160, or may be external to camera unit 160.

In one example embodiment, the OIS controller for the OIS system may be included in sensor processing unit 170. The motion sensor to measure the motion of the mobile electronic device 100 or camera unit 160 may be sensor 178. Sensor processor 172 may analyze the motion detected by sensor 178, and send control signals to the image stabilization system 166, which in this case represents the OIS system. The OIS system may send position feedback information from the position sensors in the OIS system back to sensor processor 172. The image sensor of camera unit 160 may produce sync signal, for example frame-sync signals or line-sync signals, which may be send to the sensor processing unit 170 or sensor processor 172. The control signals, sync signals, and position feedback may be communicated over host bus 120 and/or sensor processing unit bus 174. Alternatively, dedicated hardware connections, such as e.g., interrupt lines, may be used for this communication.

In another embodiment, the image stabilization system 166 may be an Electronic Image Stabilization (EIS) system. In an EIS system, the image stabilization is performed using image processing. For example, in video streams the motion of the device will result in each frames being displaced slightly with respect to each other, leading to shaky video results. The EIS system analyzes these displacements using image processing techniques, and corrects for this motion by moving the individual image frames so that they align. The displacement vectors between the images may also be determined (partially) using motion sensors. In this case, sensor 178 may be a gyroscope, and the angular velocities measured by the gyroscope are used to help determine the displacement vector from one frame to the next frame. EIS systems that use gyroscope data may be referred to as gyroscope-assisted EIS systems. The required image processing may be performed by a processor incorporated in camera unit 160, by sensor processor 172, host processor 110, and any other dedicated image or graphical processor.

Mobile electronic device 100 and more particularly image stabilization system 166 may have both an OIS system and an EIS system, which each may work separately under different conditions or demands, or both systems may work in combination. For example, the OIS may perform a first stabilization, and the EIS may perform a subsequent second stabilization, in order to correct for motion that the OIS system was not able to compensate. The EIS system may be a conventional system purely based on image processing, or a gyroscope-assisted EIS system. In the case of a gyroscope-assisted EIS system, the EIS and OIS systems may use dedicated gyroscope sensors, or may use the same sensor.

Mobile electronic device 100 also includes a general purpose sensor assembly in the form of integrated sensor processing unit (SPU) 170 which includes sensor processor 172, memory 176, at least one sensor 178, and a bus 174 for facilitating communication between these and other components of sensor processing unit 170.

Sensor processor 172 can be one or more microprocessors, CPUs, DSPs, general purpose microprocessors, ASICs, ASIPs, FPGAs or other processors which run software programs, which may be stored in memory 176, associated with the functions of sensor processing unit 170.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, sensor 178, and other components of sensor processing unit 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store sensor output specifications for sensor 178, algorithms or routines or other instructions for processing data output by sensor 178 and/or other sensors using logic or controllers of sensor processor 172, as well as storing raw or processed data output by sensor 178 or other sensors. Such algorithms and routines may be implemented by sensor processor 172 and/or by logic or processing capabilities included in sensor 178.

Sensor 178 may be one or more inertial or motion sensors (e.g., a gyroscope, accelerometer, or magnetometer) for measuring the orientation or motion of mobile electronic device 100 in space. Additionally or alternatively, a sensor 178 may comprise, without limitation, a temperature sensor, an atmospheric pressure sensor, an infrared sensors, an ultrasonic sensor, a radio frequency sensor, a navigation satellite system sensor (such as a global positioning system receiver), or other type of sensor for measuring other physical or environmental quantities.

Depending on the configuration, when sensor 178 is a motion sensor, SPU 170 measures one or more axes of rotation and/or one or more axes of linear motion of the device. In one embodiment, sensor 178 is an inertial sensor, such as rotational motion sensors or a linear motion sensor. For example, the rotational motion sensors may be gyroscopes to measure angular velocity along one or more orthogonal axes and the linear motion sensor(s) may be one or more accelerometers to measure linear acceleration along one or more orthogonal axes. In one aspect, the gyroscope(s) and/or accelerometer(s) may each have 3 orthogonal axes, such as to measure the motion of the device with 6 degrees of freedom. The signals from sensor(s) 178 may be combined in a sensor fusion operation performed by sensor processor 172 or other processing resources of mobile electronic device 100 in order to provide a six axis determination of motion. The sensor information from one or more sensors 178 may be converted, for example, into an orientation, a change of orientation, a speed of motion, or a change in the speed of motion. The information may be deduced for one or more predefined axes, depending on the requirements of a sensor client. As desired, sensor 178 may be implemented using a micro-electro-mechanical system (MEMS) that is integrated with sensor processor 172 and one or more other components of SPU 170 in a single chip or package.

Example Sensor Processing Unit Operation

Figure 2A:
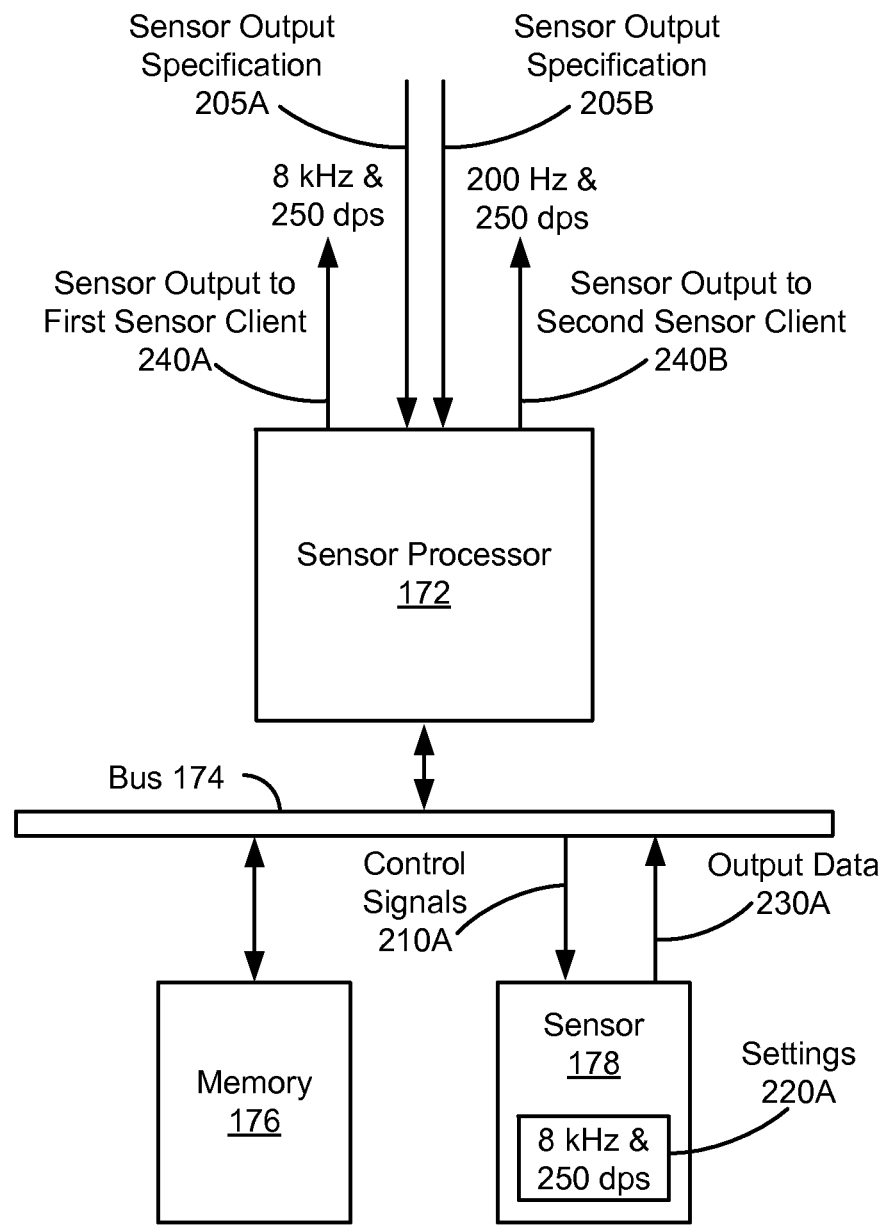
FIGS. 2A and 2B illustrate block diagrams of a sensor processing unit, and describe operation of the sensor processing unit according to various embodiments.
Figure 2B:
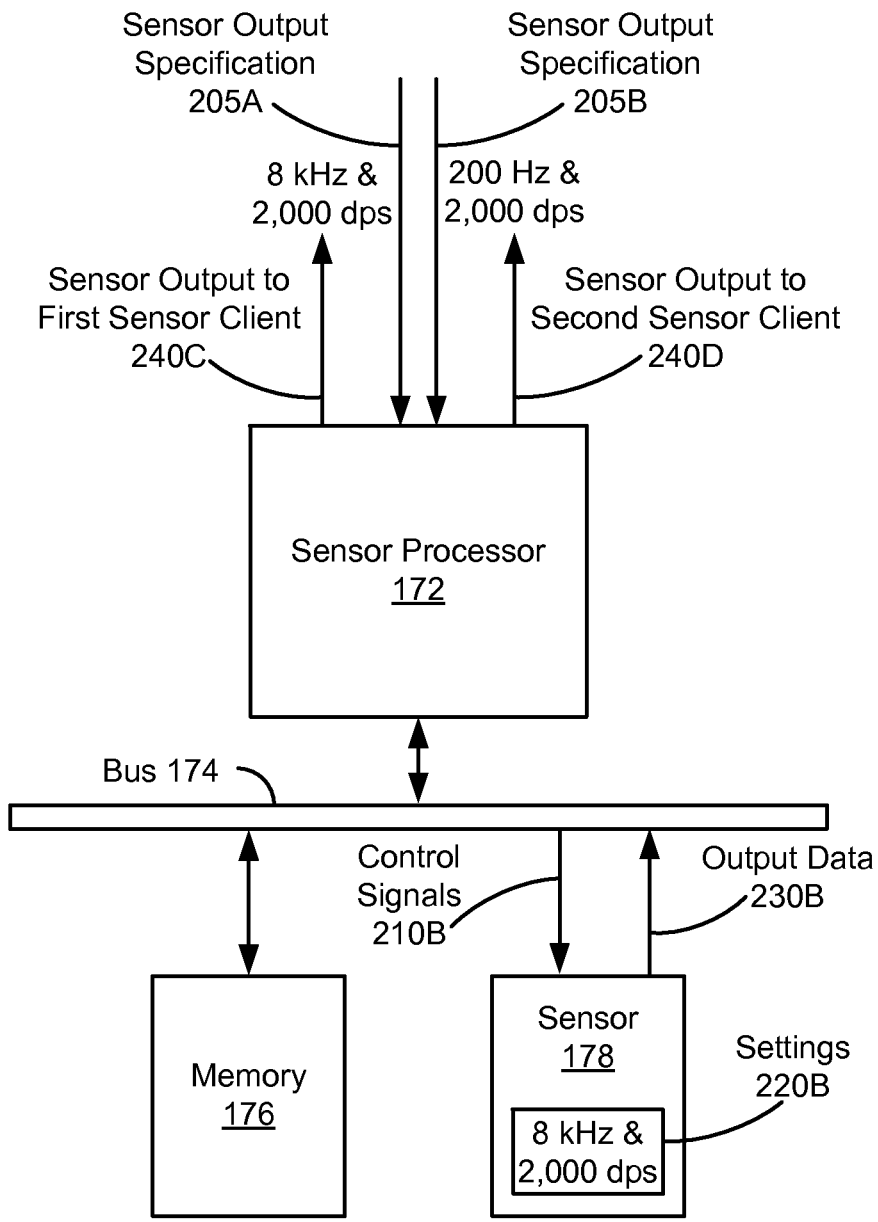

FIGS. 2A and 2B illustrate block diagrams of a sensor processing unit 170, and describe operation of the sensor processing unit 170 according to various embodiments. FIGS. 2A and 2B illustrate one example of how sensor processing unit 170 can configure sensor 178 to simultaneously satisfy sensor output specifications for a plurality of sensor clients. In the example utilized, sensor 178 is described as being a gyroscope. However, one of skill in the art will recognize that the techniques described could be similarly employed with other types of sensors and/or additional sensors and their respective sensor clients. For instance, sensor 178 could be an accelerometer in another embodiment, a pressure sensor in another embodiment, etc.

Consider an embodiment where sensor 178, a gyroscope for purposes of this example, has at least two clients ("sensor clients") that require and use its output data. Also for purposes of this example, a first sensor client is the image stabilization system 166, in the form of an OIS system, and a second sensor client is user experience system 114. Other embodiments may include different and/or additional sensor clients. It is appreciated that these two sensor clients may have different requirements for the output data of sensor 178 that are expressed as sensor output specifications. For example, an image stabilization system 166 may specify a higher output data rate and lower full scale range than a user experience system 114 due to the need to make frequent stabilization adjustments because a user imparts very small involuntary movements to mobile electronic device 100 while using the camera, but these movements may be of little consequence to user experience system 114 since the user is trying to keep the camera still. Conversely, user experience system 114 may specify a lower output data rate and a higher full scale range than image stabilization system 166 because it is trying to discern and react to larger, but often slower, user movements of mobile electronic device 100 than those compensated by image stabilization system 166.

Each sensor output specification defines one or more values for a sensor parameter of sensor 178 and/or for other sensors of sensor processing unit 170. A sensor parameter is a parameter, setting, range, or value of a sensor that can be defined in order to describe to sensor processing unit 170 how to configure and/or specify the output of the sensor. Each sensor output specification may contain definitions for more than one sensor parameter. In this example, a sensor output specification 205A from the first sensor client (e.g., image stabilization system 166) describes at least a first value for a sensor parameter of sensor 178, while a second sensor output specification 205B from the second sensor client (e.g., user experience system 114) defines a different second value for the same sensor parameter (it should be appreciated that the different sensor clients may also define identical values for a sensor parameter). In this example, the sensor parameter may be one of an output data rate (ODR) or a full scale range (FSR) for sensor 278.

The ODR of a sensor represents the frequency of the data samples that are output by the sensor 178. In many types of (MEMS) sensors an analog signal is measured at the core of the sensor, which is then transferred into a digital output by an analog-to-digital converter (ADC). The ODR represents the frequency with which the ADC converts the analog signal to the digital signal.

The FSR of a sensor represent the maximum value of the physical quantity that can be produced as an output. In most cases, this limit is not caused by the principles of the sensor, but by the limits of the ADC such as the amount of bits (e.g., 8 bits, 16 bits, 24 bits). The FSR is the maximum value of the measured parameter that can be expressed in bits. For example, a gyroscope may have an FSR of 250 degrees per second (dps), which means that the minimum digital output in bits corresponds to a rotational velocity of −250 dps, and the maximum digital output in bits corresponds to a rotational velocity of +250 dps. Even if the device rotates at a faster speed, and the analog core of the sensor may measure these higher values, the output of the gyroscope cannot exceed −250 dps or +250 dps and is thus saturated at the FSR value. A higher FSR results in a lower measurement resolution per bit because a larger range is covered by the same amount of bits. For example, for an FSR of 2000 dps, a step of 1 bit in the digital output, will corresponds to an 8 times larger step in the rotational velocity than for an FSR of 250 dps. Therefore, the FSR is usually set just above the maximum expected values so that there is no saturation with a maximum measurement resolution.

In some embodiments, one or more of the sensor output specifications 205 can include additional information than just the definition of sensor parameters. For example, sensor output specification 205A may define first values for a set of sensor parameters and sensor output specifications 205B may define second values for the set of sensor parameters. In some embodiments, the set of parameters may include e.g., values for both an output data rate and a full scale range being requested by one or more of the sensor clients. Other information may additionally be included as part of the sensor output specifications. For example, along with the first value(s) for the sensor parameters, the sensor output specification 205A may include any deviation and condition for such deviation allowed from the first value(s) by the first sensor client (e.g., image stabilization system 166). Similarly, along with the second value(s) for the sensor parameters, the sensor output specification 205B may include any deviation and condition for such deviation allowed from the second value(s) by the second sensor client, (e.g., user experience system 114). The first and second values may be defined as exact values, as a range of allowed values, or as preferred values with a range of allowed values. The additional information may also contain instructions on how to modify or process, e.g., by filtering, the sensor data in case of deviation from the specified first or second values. The additional information may also contain priority information that may be used to resolve conflicting requests. In some embodiments, sensor processor 172 utilizes the information about a deviation allowed from the first value to set the first operational condition or deviate from the first operational condition. For example, for image stabilization system 166 a first operation condition may be defined based on the information where the sensor parameter such as the FSR depends on the detected motion of the mobile electronic device 100. When the detected motion is below a first threshold, a first low value for the FSR is set, and when the detected motion is above the first threshold, a second high value for the FSR is set. The motion may be determined using the same sensor, in this case the gyroscope, or the motion information may come from other sensors, such as e.g., an accelerometer. In another example, image stabilization system 166 may allow a deviation from the first operational condition. In one embodiment, for instance, the first operational condition may be allowed to time out (e.g., for example by expiration of a watchdog timer) if camera unit 160 has been operational in a still image capture mode for longer than a predefined period of time (e.g., one minute) without an image being captured. In a similar fashion, in some embodiments, sensor processor 172 utilizes information about a deviation allowed from the second value to set the second operational condition or deviate therefrom.

The additional information provided with the sensor output specification 205 may also be used to indicate if actions or modifications may be made if the sensor client becomes inactive or is running in the background. For example, when the sensor client is a gaming applications that uses motion of the mobile electronic device 100 as an input, the sensor output is only required when the user is interacting with the gaming application. The user may stop interacting with the application without actually stopping the application, causing the gaming application to remain active in the background. In this case, the sensor output specification for the application becomes irrelevant or gets a lower priority. On the other hand, for another example of a pedestrian dead-reckoning navigation application, the sensor output must not be altered even if the user is not interacting directly with the navigation application and the application is running in the background.

Sensor processing unit 170 or a portion thereof, such as sensor processor 172, communicates directly or indirectly with the sensor clients to acquire the sensor output specifications 205 and/or to provide sensor outputs 240 to these sensor clients. An indirect communication may be with operating system 112 in order to acquire the sensor output specifications (205A, 205B) for image stabilization system 166 and/or user experience system 114 (which may be running within operating system 112) or the provide sensor outputs 240 to these sensor clients. In this case, the sensor clients communicate with the operating system 112, and the operation system 112 then communicates with the sensor processing unit 170. The communication may also pass through another part of mobile electronic device 100, such as e.g., a sensor hub. A direct communication may be with image stabilization system 166 to acquire the sensor output specification 205A and to a provide sensor output 240A to this sensor client. Similarly, a direct communication may be with user experience system 114 (or a particular application thereof) to acquire sensor output specification 205B and/or to provide a sensor output 240B to this sensor client. In some embodiments, there may be a mixture of direct and indirect communications. For example, sensor processor 172 may communicate with operating system 112 to acquire sensor output specification 205B for user experience system 114, and may also communicate with image stabilization system 166 to acquire the sensor output specification 205A.

After receiving the sensor output specifications from different sensor clients, the sensor processing unit 170 or the sensor processor 172 derives the actual sensor configuration that is used for the sensor 178. In some examples, this may not lead to any conflicts, for example when different sensor clients request identical sensor parameter values. The sensor clients may define a value of ranges for a sensor parameter, and if a common range of values may be determined within these different ranges, the sensor configuration may be performed without any conflict. In some examples, there may be non-matching or conflicting request from different sensor clients. These conflicts may be resolved using the additional information of the allowed deviations, the deviation conditions, and/or different priorities. The sensor processing unit 170 may also have additional information that may be used to resolve conflicts. The conflict resolving process may take place by the sensor processor 172, using e.g., logic or software that is stored in memory 176. In embodiments where all sensor clients all communicate indirectly through the same intermediary, such as e.g., the operating system, the conflict resolving process may be done by the intermediary. In this case, the intermediary may resolve the conflict and communicate the adapted conflictless sensor configurations to the sensor processor 172.

In some embodiments, the sensor output specifications 205 of a sensor client may depend on the task or sub-task that the sensor client is executing. The sensor output specification may therefore contain definitions of different values of the sensor parameters and allowed deviations (if any) for these different (sub) tasks. For example, image stabilization system 166 may be used to record still images and to record video, and for these different tasks the optimal sensor output specifications 205 may vary. For still image recording, a lower FSR may be defined than for video recording because less movement of the device is expected. When the image stabilization system 166 becomes active as a sensor client, the complete output specification 205, including the different tasks, may be transferred to the sensor processing unit 170 or sensor processor 172. The image stabilization system 166 will then separately inform the sensor processor which task is active, either through software communication (e.g., commands), or hardware communication (e.g., interrupt lines). The sensor processor selects the appropriate sensor output specifications based on these communications. Alternatively, the image stabilization system 166 communicates the relevant sensor output specifications for each task, when a task change takes place.

In some embodiments, the sensor output specifications 205 may be stored in memory 176 of sensor processing unit 170. In this case, the sensor processing unit 170 or sensor processor 172 will receive a request from a certain sensor client for sensor data, and the sensor processor 172 will retrieve the relevant sensor output specifications from memory 176 depending on the identity or type of the sensor client. The sensor client may only indicate which sensor it requests sensor data from. This communication may be direct or indirect, as indicated above. The communication may be software based, e.g., using commands. Alternatively, the communication may be hardware based, e.g., using interrupt lines. For example, image stabilization system 166 may have a dedicated interrupt line, to the operating system 112 or sensor processing unit 170, that signals that the image stabilization system 166 is in operation and requests e.g., gyroscope data in accordance with an output specification for the image stabilization system 166 that may then be retrieved from memory 176 (having been previously acquired or otherwise stored in memory 176).

The sensor clients may be grouped or classified, and the sensor processor 172 will select the sensor output specification 205 from memory 176 depending on the class or group that the sensor client belongs to. Examples of groups or classes may be, image stabilization, user experience, gesture recognition, etc.

Combination of the above embodiments and redistributions of tasks and information may also exist. For example, the sensor client may communicate their sensor output specifications 205 requesting certain values for sensor parameters, but without specifying allowed deviations and deviation conditions. The sensor processing unit 170 or sensor processor 172 may receive these specifications, and in case there are conflict, resolve these conflicts based on additional information stored in memory 176. This additional information may contain possible deviations and deviation conditions for specific sensor clients, sensor client groups or classes, or sensor client combinations. For example, the sensor processor 172 may receive the sensor output specification from the image stabilization system 166 and the user experience system 114, and may retrieve the allowed deviations and conditions, and the logic and rules for any conflict resolution from memory 176.

Based on the sensor output specifications that are acquired for the plurality of sensor clients, sensor processor 172 may be configured to and may operate to simultaneously provide an output of sensor 178 to the plurality of sensor clients according to the first value while a first operational condition is met, and simultaneously provide the output of sensor 178 to the plurality of sensor clients according to the second value while a different second operational condition is met. In various embodiments, these operational conditions and their associated outputs may be preprogrammed into memory 176, may be acquired in conjunction with the sensor output specifications 205, and/or may be determined by sensor processor 172 by evaluation of the acquired sensor output specifications 205.

In one example embodiment, the first operational condition may comprise a motion condition such as a linear velocity condition, a linear acceleration condition, an angular velocity condition, or an angular acceleration condition. Similarly, the second operational condition may comprise a second motion condition such as a linear velocity condition, a linear acceleration condition, an angular velocity condition, or an angular acceleration condition. The first and second operational conditions may be the same types or different types of motion conditions. The operational conditions may be derived, for example by sensor processor 172, based on the sensor output specifications and deviation conditions of several sensor clients. In addition, which value of the sensor parameters to select from the different values for the different sensor clients for the different conditions may be derived.

In one embodiment, where sensor 178 is a gyroscope, the first operational condition comprises a first angular motion condition (e.g., an angular velocity condition or an angular acceleration condition), and the second operational condition may comprise a second angular motion condition such that is different from the first angular motion condition. By way of example and not of limitation, in one embodiment, where sensor 178 is a gyroscope, the first operational condition comprises a first angular velocity condition (e.g., being at or below a threshold angular velocity of 200 degrees/second), and the second operational condition may comprise a second angular motion condition such as a second angular velocity condition (e.g., being above the threshold angular velocity of 200 degrees/second) that is different from the first angular velocity condition. Thus, when an output of sensor 178 indicates angular velocity is at or below 200 degrees/second, sensor processor 172 is configured and operates to simultaneously provide an output of sensor 178 to the plurality of sensor clients according to the first value (e.g., a first FSR setting for sensor 178) that was provided by the first sensor client. Accordingly, when an output of sensor 178 indicates angular velocity is above 200 degrees/second, sensor processor 172 is configured and operates to simultaneously provide an output of sensor 178 to the plurality of sensor clients according to the first value (e.g., a second FSR setting for sensor 178) that was provided by the second sensor client. It is appreciated that one or more forms of hysteresis may be employed with respect to the operational conditions to prevent frequent switching from one condition to another, for example, a timer may be set after a switch from one operational condition to another and a switch back may not be allowed until expiration of the timer. Additionally or alternatively, a plurality of thresholds may be employed that are separated by a great enough distance to prevent an undesired frequency of switching between providing output according to either the first value or the second value. For example, when the angular velocity is below the threshold of 200 degrees/second and the first value is set according to the first client, but the angular velocity increases above the threshold, the first angular velocity condition is no longer satisfied and therefore the first value will be set according to the second client. However, when the angular velocity is above the threshold of 200 degrees/second and the angular velocity is decreasing, the first angular velocity condition may be different, for example using a threshold of 180 degrees/second. This means that the first value will only be set according to the first client when the angular velocity decreases below the threshold of 180 degrees/second. This principle of adapting the threshold depending on the direction of the angular velocity change, defines the hysteresis that enable to avoid frequency changes of the first value. Although two conditions were used in this example, a greater number of conditions may exist where the value of the sensor parameter is varied in stages.

Such use of operational conditions to guide sensor outputs may be similarly employed with respect to other types of sensors besides gyroscopes. Consider, for example, another embodiment where sensor 178 is an accelerometer. In one such an embodiment, the first operational condition may comprise a first linear motion condition (e.g., a linear velocity condition or a linear acceleration condition), and the second operational condition may comprise a second linear motion condition that is different from the first linear motion condition. By way of example and not of limitation, the first operational condition may comprise a first linear acceleration condition, and the second operational condition may comprise a second linear acceleration condition that is different from the first linear acceleration condition. In general, the type of condition is related to the type of physical or environmental parameter that the sensor is capable of measuring.

With reference to FIG. 2A, in order to provide the proper sensor outputs based on the operational conditions, sensor processor 172 may send control signals 210A to sensor 178 when the sensor output satisfies the first operational condition, such that the settings of the sensor are adjusted. Keeping with the example used before, the first operation condition specifies an angular velocity being at or below a threshold of 200 degrees/second. These control signals may contain the required values for the sensor parameters which may be stored in the sensor's registry. In FIG. 2A, for example, settings 220A are implemented at sensor 178 in response to control signals 210A, resulting in sensor output data 230A at an ODR of 8 kHz and an FSR of 250 degrees/second. These settings allow for sensor output 240A to be provided to image stabilization system 166 at an ODR of 8 kHz and with an FSR of 250 degrees/second while sensor output 240B is provided simultaneously to user experience system 114 at an ODR of 200 Hz and with an FSR of 250 degrees/second. In this example, the settings 220A are optimized for the first sensor client, image stabilization system 166, under the first operational condition. The ODR of 8 kHz is not required for the second sensor client, user experience system 114. Although not required, the sensor output may be provided to the user experience system 114 at an ODR of 8 kHz (which may have been specified in the sensor output specifications). However, this would require more processing power than is actually needed for the user experience system. Therefore, the sensor processor 172 may filter the 8 kHz output data rate of sensor 178, such as by averaging values, down sampling, decimation (i.e., selecting every $40^{th}$ value), etcetera, in order to achieve the 200 Hz output data rate for sensor output 240B for the second sensor client, the user experience system 114. The instructions for this required processing may be included in the additional information stored with the sensor output specification 205 stored for the different sensor clients, or may be stored in sensor processing unit 170.

With reference to FIG. 2B, in order to provide the proper sensor outputs based on the operational conditions, sensor processor 172 may send control signals 210B to sensor 178 when the sensor output satisfies the second operational condition, such that the settings of the sensor are adjusted. In FIG. 2B, for example, settings 220B are implemented at sensor 178 in response to control signals 210B, resulting in sensor output data 230B at an ODR of 8 kHz and an FSR of 2000 degrees/second. These settings allow for sensor output 240C to be provided to image stabilization system 166 at an ODR of 8 kHz and with an FSR of 2,000 degrees/second while sensor output 240D is provided simultaneously to user experience system 114 at an ODR of 200 Hz and with an FSR of 2,000 degrees/second. It is appreciated that sensor processor 172 may filter the 8 kHz output data rate of sensor 178, such as by averaging values, down sampling, decimation (i.e., selecting every $40^{th}$ value), etcetera, in order to achieve the 200 Hz output data rate for sensor output 240D for the second sensor client, the user experience system 114.

The examples of FIGS. 2A and 2B may be interpreted as follows. When image stabilization system 166 is active, the ODR rate of the gyroscope is set of 8 kHz because image stabilization system 166 is used to reduced high frequency movements cause by the trembling of the hand of the user holding the mobile electronic device 100. An FSR of 250 dps is chosen for the gyroscope setting for low motion conditions of the device (<200 dps) because the trembling has a low amplitude, and therefore a low FSR allows a higher resolution of the measurements. When the movements of the user approach the maximum of the FSR of 250 dps, there is a risk that the output of the gyroscope saturates if the motion increases further. In order to avoid saturation problems of the sensor with the user experience system 114, the FSR of the gyroscope is increased to 2000 dps when the detected motion increases above the threshold of 200 dps. This would mean that the resolution of the motion measurements is less accurate for the image stabilization system 166, but since the motion is high, the image stabilization may not perform optimally anyway, and taking quality images may be difficult.

In addition to strictly switching from providing output according to a first value to providing output according to a second value, sensor processor 172 may also incorporate other rules which govern when a switch may or may not be implemented. For example, in one embodiment memory 176 may include a rule or a received instruction which causes sensor processor 172 to delay a switch from providing the output according to the first value to providing the output according to the second value until after completion of an ongoing operation, such as an ongoing image capture operation, associated with the first of the plurality of sensor clients. This rule may be pre-programmed into memory 176 or acquired via communication between image stabilization system 166 and sensor processing unit 170. Similarly, an instruction, flag setting, or interrupt received by sensor processor 172 may enable the delay in switching. Such a delay allows image stabilization system 166 to continue receiving properly formatted output data, for its most effective operation, from sensor 178 in an instance where image capture (i.e., video recording, still image capture, panoramic image capture, etc.) is underway, but not completed, when operational conditions otherwise indicate that a switch to outputting at according to the second value should take place.

In many embodiments the sensor output 240, the communication, and the input for the sensor clients will be based on the same amount of bits. For example, the sensor output may be 16-bit (due to the sensor's ADC), which means that the 16-bit data is used throughout the system. In some embodiments it may be advantageous if sensor 178 has a capability for a higher amount of bits than the rest of the system. For example, consider that the ADC of sensor 178 has 24-bit capabilities, which means that the output data 230 of sensor 178 can be produced as 24-bit, while the rest of the system operates at a 16-bit basis. In this case, sensor processor 172, or any other part of sensor processing unit 170, may convert the 24-bit output data 230 into 16-bit sensor output 240 to the clients. Sensor processor 172 may take the most significant bits, or may choose to take any other 16-bit section of the 24-bit data, depending on the sensor client. For example, sensor processor 172 may select the most significant 16-bit section for the user experience system 114, and may select the least significant 16-bit section for the image stabilization system 166. In this case, the FSR for the sensor may be set at 2000 dps without any angular velocity condition because by taking the least significant 16-bit section for the image stabilization system 166 a high enough bit-resolution is obtained.

Example Methods of Operation

Figure 3:
FIG. 3 illustrates a flow diagram of an example method of sensor output configuration, according to various embodiments.

FIG. 3 illustrates a flow diagram 300 of an example method of sensor output configuration, according to various embodiments. Procedures of this method will be described with reference to elements and/or components of one or more of FIGS. 1, 2A, and 2B. It is appreciated that in some embodiments, the procedures may be performed in a different order than described, that some of the described procedures may not be performed, and/or that one or more additional procedures to those described may be performed. Flow diagram 300 includes some procedures that, in various embodiments, are carried out by one or more processors under the control of computer-readable and computer-executable instructions. It is further appreciated that one or more procedures described in flow diagram 300 may be implemented in hardware, or a combination of hardware with firmware and/or software.

With reference to FIG. 3, at procedure 310 of flow diagram 300, in one embodiment, for a sensor, sensor output specifications 205 for a plurality of sensor clients are acquired, wherein a first sensor output specification for a first of the plurality of sensor clients defines a first value for a sensor parameter, wherein a second sensor output specification for a second of the plurality of sensor clients defines a second value for the sensor parameter, and wherein the first value and the second value are different. As described previously, sensor processing unit 170 (and more particularly sensor processor 172) operates to acquire the plurality of output specifications from the plurality of sensor clients for sensor 178. Sensor 178 may be any of a variety of different physical or environmental sensors. For example, and without limitation, sensor 178 may a gyroscope, an accelerometer, a temperature sensor, an atmospheric pressure sensor, a magnetometer, an infrared sensors, an ultrasonic sensor, a radio frequency sensor, or a navigation satellite system sensor. The plurality of sensor clients may be two or more sensor clients, for example a first sensor client may be image stabilization system 166, while a second sensor client is user experience system 114, and a third sensor client is operating system 112. In an embodiment where sensor 178 is a gyroscope, the first value may be a first full scale range setting parameter (e.g., specified as an angular velocity) for sensor 178 while the second value may be a second full scale range parameter for sensor 178. In an embodiment where sensor 178 is an accelerometer, the first value may be a first full scale range parameter specification (e.g., specified as a linear acceleration) for sensor 178 while the second value may be a second full scale range parameter for sensor 178. It is appreciated that any portion of a first value may be specified as a single value or as a range of values, and similarly that any portion of a second value may be specified as a single value or as a range of values.

In some embodiments, the output specifications (e.g., 205A, 205B, etc.) acquired by sensor processor 172 may define first values for a set of sensor parameters. In various embodiments, the set of sensor parameters comprises at least one of, and sometimes both of, a full scale range parameter and an output data rate parameter. Sensor processing unit 170 which includes said sensor operates to simultaneously provide the output of a sensor, such as sensor 178, to a plurality of sensor clients according to the sensor output specification(s) that it has received or acquired from the sensor clients. For example, a first output specification 205A may define a first value for a full scale range parameter of sensor 178 and a first value of an output data rate parameter for sensor 178, while a second sensor output specification 205B may define a second value for the full scale range parameter of sensor 178 and a second value of the output data rate parameter for sensor 178. In order to simultaneously provide output from a sensor at two different output data rates, a sensor may be set to sample and output sensor data at a higher rate than one or more of the simultaneous output data rates. Sensor processor 172 then operates to filter the data (by averaging, down sampling, decimation, etc.) in order to supply sensor data outputs simultaneously at the specified output data rates. Similarly, a first sensor client may require a first value for a full scale range parameter of a sensor resulting in sensor data output with higher values than can be handled by a second sensor client (as specified in the sensor output specification for the second sensor client). In this case, the sensor processing unit 170 may filter the sensor output data so that the data remains within values that can be accepted by the second client.

In some embodiments, other information may additionally be acquired as part of or along with the acquisition of the sensor output specifications. For example, along with the first value(s), the sensor output specification 205A may include any information about a deviation and condition for such deviation allowed from the first value(s) by the first sensor client (e.g., image stabilization system 166). Similarly, along with the second value(s), the sensor output specification 205B may include any information about a deviation and condition for such deviation allowed from the second value(s) by the second sensor client, (e.g., user experience system 114).

In some embodiments, sensor processor 172 utilizes the information about a deviation (if any) allowed from the first value to set the first operational condition and/or deviate from the first operational condition. For example, image stabilization system 166 may allow a deviation from the first operational condition. In one embodiment, for instance, the first operational condition may be allowed to time out if camera unit 160 has been operational in a still image capture mode for longer than a predefined period of time (e.g., one minute) without an image being captured. In one embodiment, a deviation may allow for a different first value and thus a different first operating condition may be set when camera unit 160 is operating in a video capture mode than when camera unit 160 in operating in a still image capture mode.

In a similar fashion, in some embodiments, sensor processor 172 utilizes acquired information about a deviation (if any) allowed from the second value to set the second operational condition and/or allow deviation therefrom. For example, user experience system 114 may specify that the full scale range parameter of 2,000 degrees/second for received data from sensor 178 is not critical, and may be deviated from, while a measured angular velocity is below 240 degrees/second. Using this information, sensor processor 172 can send control signals 210A to sensor 178 to adjust settings 220A to full scale range of 250 degrees per second (which is more amenable to image stabilization system 166) during a period of time while measured angular velocity by sensor 178 meets the first operational condition. In other words, if the image stabilization system 166 becomes active and requests an FSR of 250 dps, while the user experience system 114 was already active with an FSR of 2000 dps, the FSR can be adapted to the FSR of 250 dps request by image stabilization system 166 if the first condition of an angular velocity of smaller than 240 dps is satisfied. The changes in FSR may be made when the camera application of the mobile electronic device 100 is started, or only when the user interacts with the application or presses a button/interacts with a user interface to take the picture. In the latter embodiment, the time that the FSR is adapted for the image stabilization system 166 is more limited. The FSR may switch back to the FSR of the user experience system 114 when the picture has been taken, or when the user has terminated the camera application. The communication that the user has instructed camera unit 160 to take a picture may be done in software (e.g., commands) or in hardware (e.g., interrupt line). If the first condition is no longer satisfied during the active state of image stabilization system 166, the FSR may be switched back. This means that if during the taking of the picture the angular velocity increases above the threshold of 240 dps, the FSR may be changed from 250 dps back to 2000 dps.

With continued reference to FIG. 3, at procedure 320 of flow diagram 300, in various embodiments, based on the sensor output specifications 205 for the plurality of sensor clients, sensor processing unit 170, which includes sensor 178 is configured to and operates to simultaneously provide output of sensor 178 in one of the manners specified in procedures 322 and 324.

With continued reference to FIG. 3, at procedure 322 of flow diagram 300, in one embodiment, sensor processor 172 is configured to and operates to simultaneously provide an output of the sensor (e.g., sensor 178) to the plurality of sensor clients according to the first value for a sensor parameter while a first operational condition is met. This may comprise sensor processor 172 simultaneously providing the output of sensor 178 to the plurality of sensor clients according to the first value while a first motion condition is met. The first motion condition may be at least one of: a linear velocity condition, a linear acceleration condition, an angular velocity condition, and an angular acceleration condition. For example, while an angular velocity at or below 200 degrees/second is measured, sensor processor 172 provides output data of sensor 178 according to the first value (e.g., with sensor 178 set at a first value which comprises a full scale range setting of 250 degrees/second).

With reference to FIG. 3, at procedure 324 of flow diagram 300, in one embodiment, sensor processor 172 is configured to and operates to simultaneously provide an output of the sensor (e.g., sensor 178) to the plurality of sensor clients according to the second value while a second operational condition is met, where the first operational condition and the second operational condition are different. This may comprise sensor processor 172 simultaneously providing the output of sensor 178 to the plurality of sensor clients according to the second value while a second motion condition is met. The second motion condition may be at least one of: a linear velocity condition, a linear acceleration condition, an angular velocity condition, and an angular acceleration condition. For example, when an angular velocity above 200 degrees/second is measured, sensor processor 172 provides output data of sensor 178 according to the second value (e.g., with sensor 178 set at a second value which comprises a full scale range setting of 2,000 degrees/second). A third operating condition, such as the measured angular velocity sinking below 180 degrees/second being measured, may be required before switching back to providing output data of sensor 178 according to the first value. As detailed above, other mechanisms for introducing hysteresis may additionally or alternatively be employed in order to reduce excessive/undesired switching between the output modes described in procedures 322 and 324.

In addition to strictly switching from providing output according to a first value to providing output according to a second value, sensor processor 172 may also incorporate other rules which govern when a switch may or may not be implemented. For example, in one embodiment memory 176 may include a rule which causes sensor processor 172 to delay a switch from providing the output according to the first value to providing the output according to the second value until after completion of an ongoing image capture operation associated with the first of the plurality of sensor clients. This rule may be pre-programmed into memory 176 or acquired via communication between image stabilization system 166 and sensor processing unit 170. Such a delay allows image stabilization system 166 to continue receiving properly formatted output data, for its most effective operation, from sensor 178 in an instance where image capture (i.e., video recording, still image capture, panoramic image capture, etc.) is underway, but not completed, when operational conditions otherwise indicate that a switch to outputting at according to the second value should take place. This further includes performing functions incident to image capture. For instance, while a user is zooming out, focusing, setting a flash, or performing some other function incident to image capture with camera unit 160, sensor processor 172 may be signaled by image stabilization system 166 to delay switching from providing output according to a first value to providing output according to a second value.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method of sensor output configuration comprising:
   acquiring, for a sensor, sensor output specifications for a plurality of sensor clients, wherein a first sensor output specification for a first of said plurality of sensor clients defines a first value for a sensor parameter, wherein a second sensor output specification for a second of said plurality of sensor clients defines a second value for said sensor parameter, and wherein said first value and said second value are different;
   based on said sensor output specifications for said plurality of sensor clients, configuring a sensor processing unit which includes said sensor to:
      simultaneously provide an output of said sensor to said plurality of sensor clients according to said first value while a first operational condition is met; and
      cease providing said output of said sensor according to said first value and switch to simultaneously providing said output of said sensor to said plurality of sensor clients according to said second value while a second operational condition is met, wherein said first operational condition and said second operational condition are different, and wherein as part of said switch said sensor processor unit adjusts sensor operation by changing said sensor parameter from said first value to said second value.

2. The method as recited in claim 1, wherein said acquiring, for a sensor, sensor output specifications for a plurality of sensor clients, wherein a first sensor output specification for a first of said plurality of sensor clients defines a first value for a sensor parameter, wherein a second sensor output specification for a second of said plurality of sensor clients defines a second value for said sensor parameter, and wherein said first value and said second value are different further comprises:
   acquiring, along with said first value, any information about a deviation and condition for such deviation allowed from said first value; and
   acquiring, along with said second value, any information about a deviation and condition for such deviation allowed from said second value.

3. The method as recited in claim 2, further comprising:
   utilizing said information about said deviation allowed from said first value to set said first operational condition; and
   utilizing said information about said deviation allowed from said second value to set said second operational condition.

4. The method as recited in claim 1, wherein said acquiring, for a sensor, sensor output specifications for a plurality of sensor clients, wherein a first sensor output specification for a first of said plurality of sensor clients defines a first value for a sensor parameter, wherein a second sensor output specification for a second of said plurality of sensor clients defines a second value for said sensor parameter, and wherein said first value and said second value are different comprises:
   acquiring said first sensor output specification, wherein said first sensor output specification defines first values which include said first value for a set of sensor parameters, and wherein said set of sensor parameters comprises at least one of a full scale range parameter and an output data rate parameter; and
   acquiring said second sensor output specification, wherein said second sensor output specification defines second values which include said second value for said set of sensor parameters.

5. The method as recited in claim 1, further comprising:
   configuring said sensor processing unit which includes said sensor to utilize filtering to simultaneously provide said output of said sensor to said plurality of sensor clients according to the sensor output specifications.

6. The method as recited in claim 1, wherein said configuring a sensor processing unit which includes said sensor to simultaneously provide an output of said sensor to said plurality of sensor clients according to said first value while a first operational condition is met comprises:
   configuring said sensor processing unit which includes said sensor to simultaneously provide said output of said sensor to said plurality of sensor clients according to said first value while said first operational condition is met, wherein said first operational condition is a first motion condition.

7. The method as recited in claim 6, wherein said first motion condition is at least one of: a linear velocity condition, a linear acceleration condition, an angular velocity condition, and an angular acceleration condition.

8. The method as recited in claim 6, wherein said configuring a sensor processing unit which includes said sensor to simultaneously provide said output of said sensor to said plurality of sensor clients according to said second value while a second operational condition is met comprises:
   configuring said sensor processing unit which includes said sensor to simultaneously provide said output of said sensor to said plurality of sensor clients according to said second value while said second operational condition is met, wherein said second operational condition is a second motion condition, and wherein said first motion condition is different from said second motion condition.

9. The method as recited in claim 1, further comprising:
   configuring said sensor processing unit which includes said sensor to delay said switch from configuring said output according to said first value to configuring said output according to said second value until after completion of an ongoing operation associated with said first of said plurality of sensor clients.

10. A sensor processing unit comprising:
   a sensor; and
   a sensor processor configured to:
      acquire, for said sensor, sensor output specifications for a plurality of sensor clients, wherein a first sensor output specification for a first of said plurality of sensor clients defines a first value for a sensor parameter, wherein a second sensor output specification for a second of said plurality of sensor clients defines a second value for said sensor parameter, and wherein said first value and said second value are different;

based on said sensor output specifications for said plurality of sensor clients, simultaneously provide an output of said sensor to said plurality of sensor clients according to said first value while a first operational condition is met; and cease providing said output of said sensor according to said first value and switch to simultaneously providing said output of said sensor to said plurality of sensor clients according to said second value while a second operational condition is met, wherein said first operational condition and said second operational condition are different, and wherein as part of said switch said sensor processor unit adjusts sensor operation by changing said sensor parameter from said first value to said second value.

11. The sensor processing unit of claim 10, wherein said sensor processor is further configured to:
utilize filtering to simultaneously provide said output of said sensor at a plurality of output data rates.

12. The sensor processing unit of claim 10, wherein said sensor is:
a gyroscope, and wherein said first operational condition comprises a first angular motion condition, and wherein said second operational condition comprises a second angular motion condition that is different from said first angular motion condition.

13. The sensor processing unit of claim 12, wherein said sensor processor is further configured to:
delay said switch from providing said output according to said first value to providing said output according to said second value until after completion of an ongoing image capture operation associated with said first of said plurality of sensor clients.

14. The sensor processing unit of claim 10, wherein said sensor is:
an accelerometer, and wherein said first operational condition comprises a first linear motion condition, and said second operational condition comprises a second linear motion condition that is different from said first linear motion condition.

15. A mobile electronic device comprising:
an image stabilization system configured to stabilize an image captured by said mobile electronic device;
a user experience system which reacts to motion of said mobile electronic device; and
a sensor processing unit configured to:
acquire, for a sensor of said sensor processing unit, sensor output specifications for a plurality of sensor clients, wherein a first sensor output specification for a first of said plurality of sensor clients defines a first value for a sensor parameter, wherein a second sensor output specification for a second of said plurality of sensor clients defines a second value for said sensor parameter, and wherein said first value and said second value are different, wherein said plurality of sensor clients comprises said image stabilization system and said user experience system; and based on said sensor output specifications for said plurality of sensor clients, simultaneously provide an output of said sensor to said plurality of sensor clients according to said first value while a first operational condition is met; and cease providing said output of said sensor according to said first value and switch to simultaneously providing said output of said sensor to said plurality of sensor clients according to said second value while a second operational condition is met, wherein said first operational condition and said second operational condition are different, and wherein as part of said switch said sensor processor unit adjusts sensor operation by changing said sensor parameter from said first value to said second value.

16. The mobile electronic device of claim 15, wherein said sensor processing unit is further configured to:
utilize filtering to simultaneously provide said output of said sensor at a plurality of output data rates.

17. The mobile electronic device of claim 15, wherein said sensor is:
a gyroscope, and wherein said first operational condition comprises a first angular motion condition, and wherein said second operational condition comprises a second angular motion condition that is different from said first angular motion condition.

18. The mobile electronic device of claim 15, wherein said sensor processing unit is further configured to:
delay said switch from providing said output according to said first value to providing said output according to said second value until after completion of an ongoing image capture operation associated with said image stabilization system.

19. The mobile electronic device of claim 15, wherein said sensor is
an accelerometer, and wherein said first operational condition comprises a first linear motion condition, and said second operational condition comprises a second linear motion condition that is different from said first linear motion condition.

20. The mobile electronic device of claim 15, wherein said sensor processing unit is configured to acquire said sensor output specifications via an operating system of said mobile electronic device.

21. The mobile electronic device of claim 15, wherein said sensor processing unit is configured to acquire said first sensor output specification via said image stabilization system and said second sensor output specification via an operating system of said mobile electronic device.

22. The mobile electronic device of claim 15, wherein said sensor processing unit is configured to acquire said first sensor output specification from a memory of sensor processing unit in response to an interrupt which indicates said image stabilization system is active.

* * * * *